(No Model.) 3 Sheets—Sheet 1.
R. A. DANIELS.
WEIGHING AND PRICE SCALE.

No. 530,930. Patented Dec. 18, 1894.

Witnesses.
Chas. E. Van Dorn.
F. S. Lyon

Inventor.
Rienzi A. Daniels.
By Paul V. Hawley
his Attorneys (No Model.) 3 Sheets—Sheet 2.

R. A. DANIELS.
WEIGHING AND PRICE SCALE.

No. 530,930. Patented Dec. 18, 1894.

Witnesses. Inventor:
Chas. E. Van Doren, Rienzi A. Daniels.
F. S. Lyon By Paul & Hawley
his Attorneys.

(No Model.) 3 Sheets—Sheet 3.

R. A. DANIELS.
WEIGHING AND PRICE SCALE.

No. 530,930. Patented Dec. 18, 1894.

Witnesses:
Chas. E. Van Doren.
Richard Paul

Inventor:
Rienzi A. Daniels.
By Paul & Hawley
his Attorneys.

UNITED STATES PATENT OFFICE.

RIENZI A. DANIELS, OF MINNEAPOLIS, MINNESOTA.

WEIGHING AND PRICE SCALE.

SPECIFICATION forming part of Letters Patent No. 530,930, dated December 18, 1894.

Application filed November 21, 1893. Serial No. 491,531. (No model.)

*To all whom it may concern:*

Be it known that I, RIENZI A. DANIELS, of the city of Minneapolis, county of Hennepin, State of Minnesota, have invented certain new and useful Improvements in Weighing and Price Scales, of which the following is a specification.

My invention relates to weighing and price scales and in particular to improvements on the device shown and described in a patent of the United States granted to me December 9, 1890, and numbered 442,218.

The object of my invention is to provide a scale of a somewhat cheaper construction than that shown in said patent and a construction far better adapted for convenient and rapid operation or use.

In the above mentioned patent the scale described has two beams which alternately move apart, and then toward one another effecting a slight confusion. This I desire to obviate by fixing the price and total price scalebeams so that the same will move together remaining parallel at all times.

To this end my invention consists in the constructions and combinations all as hereinafter described and particularly pointed out in the claims.

The invention will be more readily understood by reference to the accompanying drawings, in which—

Figure 1:
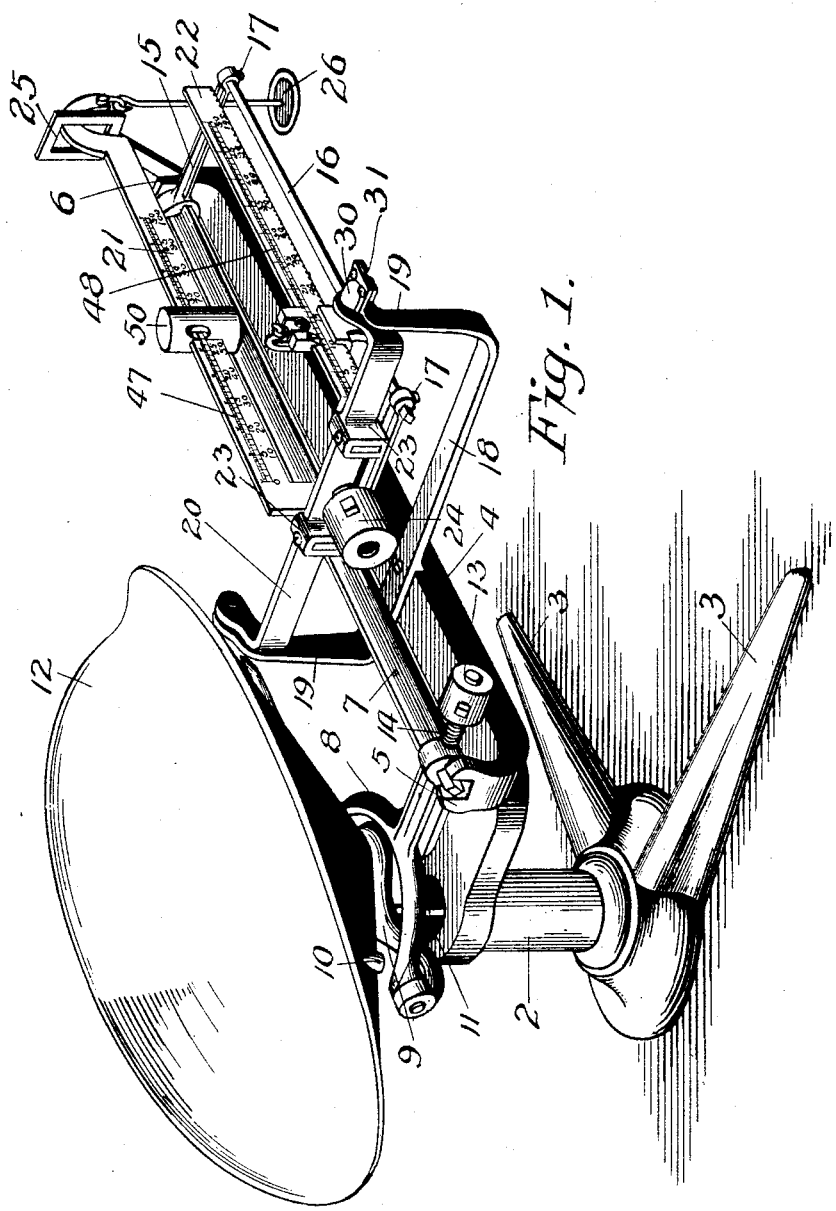
Figure 2:
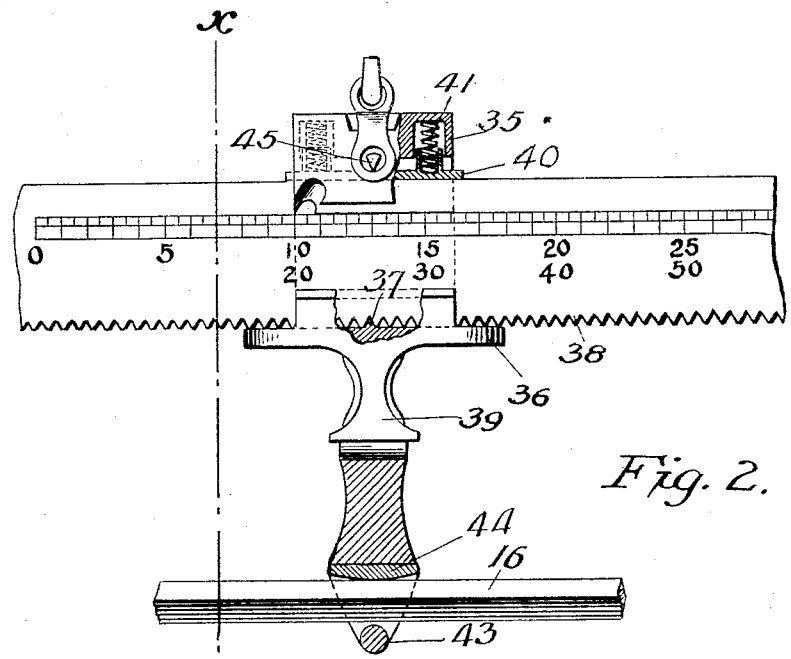
Figure 3:
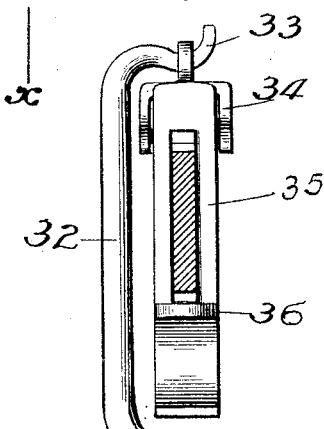
Figure 4:
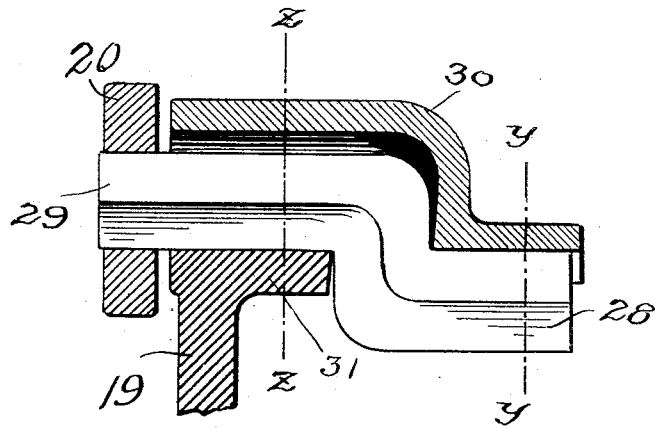
Figure 5:
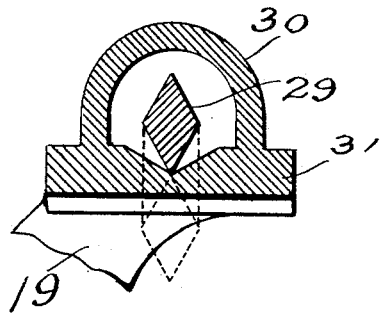
Figure 6:
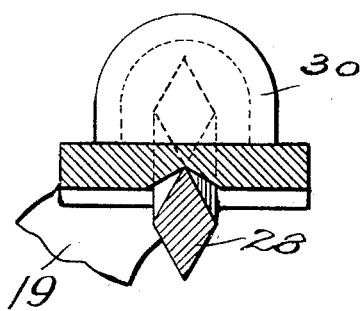

Figure 1 is a perspective view showing a weighing and price scale embodying my invention. Fig. 2 is an enlarged sectional view of the sliding sleeve of the price per pound scale beam. Fig. 3 is a view of the poise and link on the line $x$—$x$ of Fig. 2. Fig. 4 is a detail view of one of the double knife edge pivots of the beam yoke. Fig. 5 is a transverse section on the line $z$—$z$ of Fig. 4. Fig. 6 is a transverse section on the line $y$—$y$ of Fig. 4.

My present scale differs from that covered by my former patent, in respect to the transversely arranged locking bar or yoke 20, which is one of the essential features of my present invention, for by its use I secure a constant parallel movement of the scale beams 21 and 22 thus rendering the reading of the scale much easier, which feature is not embodied in my former invention.

In the drawings, I have shown a device embodying my invention as adapted for counter use, the same having a single scoop only. It is obvious, however, that the device may be as well and as beneficially used upon a platform scale or upon a combination platform and scoop device. A suitable base 2 provided with the distended feet 3 serves to uphold the weight of the long upper extension or arm 4 upon the top of the base and also the weight of the parts upon said arm. At opposite ends the arm is provided with the vertical standards or lugs 5 and 6 wherein are pivoted or journaled the opposite ends of the rock-shaft 7. The pivotal points are preferably knife-edged. At the inner end of the shaft the yoke 8 extends laterally therefrom to meet the pivotal engagement of the yoke 9 having the usual scoop-rack 10 and held in a proper position by the vertical guide rod 11.

12 represents the scoop, the weight of which is counterbalanced by the counter-poise 13 arranged to be set upon the threaded stud 14 extending from the opposite side of the rock-shaft 7. Upon the forward end of the rock-shaft and from an intermediate part thereof, I provide the rigid arms 15, of equal length and having in their ends holes to receive the square steel rod 16, preferably secured therein by screws 17. The vertical movement of this rod affects the scale-beam and the position of the poise upon the total price-beam, determines the position of the rod and therewith of the rock-shaft and scoop. At a point upon the arm 4, sufficiently removed from the inner end thereof to avoid interference with the scoop is fixed the cross-bar 18 having the standards 19. In the upper ends of these standards I pivot or journal the rocking-bar or beam-yoke 20, the ends of which are carried forward to their pivot points in order that the zero points upon the beams 21 and 22, secured to the rocking bar or yoke 20, may be in line with the pivotal center of said bar. The bar 20 is provided with the integral sleeves 23, into which the ends of the sleeves 21 and 22 are inserted and fastened. The beam 21 is preferably raised while the beam 22 is preferably depressed below the plane of the bar 20. The beams are counterbalanced by the adjustable weight 24 arranged upon the stud projecting from the opposite side of the bar 20. The movement of the beams is limited by the loop 25 arranged upon the forward end of the arm 4, and the additional weight plate 26 preferably hangs from the outer end of the beam 21.

The rocking bar 20 carrying the scale-beams is provided at each end with the double knife edge pivots shown in Fig. 4, the knife edges 28 and 29 being in exact line with one another and accommodated in oppositely arranged grooved blocks 30 and 31, the pivot from the under side preventing the displacement of the bar by a sudden up-stroke. The scale-beam 22 is arranged directly above and parallel with the rod 16 and is connected therewith by the link 32. The upper end of this link is provided with a hook 33 engaging an eye 34 upon the top of the sliding sleeve 35. This sleeve embraces the beam and on the under side is provided with the extending lug 36 and with the V-shaped tooth 37 adapted to enter any of the notches 38 formed in the under side or edge of the beam 22. The tooth entering the same holds the sleeve in place and gives the same accurate position. The sleeve can only be disengaged from the beam by drawing down on the depending lug 39 of the sleeve, which movement is permitted by the construction of the upper part of the sleeve, where, as shown, a gib 40 is interposed between the top of the sleeve and the top of the beam, and the springs 41 normally hold up the sleeve to keep its tooth in engagement with the serrated edge of the beam. The flaring lower end of the lug 39 permits it to be easily grasped by the fingers and held down while the sleeve is being moved. The lower end of the link has an eye or loop 43 engaging the diamond shape or square rod 16, the edge of which engages the steel block 44 provided in the top of the eye 43, and which block in addition to having the V-shaped groove, is also curved in longitudinal cross section, as shown in Fig. 2. The curved line is struck from the swinging center of the edge of the link and thus the distance or radius between the top of the sleeve and the rod 16 is made constant and the link prevented from binding on the rod. To permit still freer movement the eye 34 is preferably formed as a yoke link embracing the top of the sleeve and pivoted upon the knife edges 45 shown.

The scale beams are provided with the graduations 47 and 48, respectively and preferably the same. Two rows of figures are preferably used upon each beam, the same being the fractions of a dollar, or other coin unit.

In preparing the scales for use an exact balance is made upon opposite sides of the rock-shaft 7, the scoop, yoke and other parts balancing the counter-balace 13, the arms 15, the rod 16, and finally the link 32 and the sleeve connected therewith. The rod 16 tending to move up forces upon the link, which, through its hook 33, lifts the weight of the sliding sleeve from the price-per-pound beam 22.

Thus regardless of the position of the sleeve upon the beam 22, and so long as the poise 50 on the beam 21 is at zero the scale will be in balance.

Now suppose that it is desired to furnish a customer thirty cents' worth of material costing ten cents a pound. First, the sleeve upon the beam 22 is moved out and secured opposite the figure 10 thereon and in the upper row of figures. The poise 50 is then moved out to register with the mark 30 upon the beam 21, after which sufficient material is placed in the scoop to lift the beams. Again suppose a dollar's worth of material costing fifty cents a pound is desired. The sleeve and link upon the price per pound beam 22 would be moved out to register with the figure 50 in the lower row of figures on said beam, after which the poise 50 on the beam 21 would be moved opposite the one dollar mark upon the said beam 21 and the scale then brought to balance by material placed in the scoop. This would show two pounds of material given, but to prove this by the scale, the sleeve on the beam 22 might be moved to 10 and if the poise 50 were then brought to the poise 20 upon the beam 21 the scale would be found to be in perfect balance. If it is desired to weigh a hundred pounds the sleeve of the beam 22 would be placed at the first mark on said beam and the poise 50 moved out to the end, this of course presuming that the scale is strong enough to admit of such weight.

From the above illustrations it appears that the same ratio must exist between the position of the sleeve on the price beam 22 and the position of the poise on the beam 21 that there is between the price per pound and the value of the quantity of material purchased. It therefore follows that if the poise 50 be placed on the scale or beam 21 in the ratio of two to one in respect to the position of the sleeve on the beam 22, it will require a weight of two pounds in the scoop to balance the weight on the beam 21.

By the use of sixteen marks or multiples thereof, the weight in ounces may be determined.

Having thus described my invention, I claim as new and desire to secure by Letters Patent—

1. The combination, with the base, of a rock-shaft 7 journaled thereon, a yoke arm extending therefrom and connected with the weighing support or receptacle, arms 15 projecting from the opposite side of said rock-shaft, a rod 16 connecting the outer ends of said arms, an elevated and transversely arranged rocking bar or yoke 20, the two parallel scale beams secured upon said bar, the poise upon one of said beams, a sleeve on the other, and a link connecting said sleeve with said rod 16, substantially as described.

2. The combination, with the base, of a rock-shaft 7 journaled thereon, a yoke-arm extending therefrom and connected with the weighing support or receptacle, arms 15 projecting from the opposite side of said rock-shaft, a rod 16 connecting the outer ends of said arms, an elevated and transversely arranged rocking bar or yoke 20, the two parallel scale beams secured upon said bar, the poise upon one of said beams, a sleeve on the other, a link connecting said sleeve with said rod, the second scale beam being arranged directly above said rod 16, and means for securing said sleeve upon said beam at accurate points thereon, substantially as described.

3. The combination, in a weighing and price scale, of a base having a weighing mechanism thereon, a vertically movable rod 16 forming a part of said mechanism, a scale beam arranged above said rod and forming a part of said mechanism a sliding sleeve upon said beam, a slidable and pivotal link connecting said sleeve with said rod 16, the lower edge of said beam being serrated, a spring gib in the top of said sleeve, and the lower part of said sleeve provided with a tooth and adapted to engage the lower part of the beam, substantially as described.

4. The combination, with the base, of the rock-shaft thereon, the scoop rack connected with said rock-shaft, the arms projecting from the opposite side of said rock-shaft and connected by a rod 16, the elevated bar 20 having the double upper and lower knife-edges, upper and lower bearings for said knife edges, beams projecting from said bar 20, the poise upon one of said beams, a sliding sleeve on the other, and a link connecting said sliding sleeve with said rod 16, and said sleeve and link being adapted to move backward and forward on said scale rod, substantially as described.

In testimony whereof I have hereunto set my hand, this 14th day of November, 1893, at Minneapolis, Minnesota.

RIENZI A. DANIELS.

In presence of—
C. G. HAWLEY,
FREDRIK S. LYON.